United States Patent
Kuck

[15] 3,706,993
[45] Dec. 19, 1972

[54] SEARCH SYSTEM
[72] Inventor: John H. Kuck, Silver Spring, Md.
[73] Assignee: The United States of America as represented by the Secretary of the Navy
[22] Filed: March 9, 1964
[21] Appl. No.: 350,951

[52] U.S. Cl. ..........................343/7.7, 343/8, 343/9, 343/17.1 R
[51] Int. Cl. ...............................................G01s 9/42
[58] Field of Search.........343/5, 7.7, 8, 9, 11, 13, 14, 343/17.1 R, 17.1

[56] References Cited
UNITED STATES PATENTS

| | | | |
|---|---|---|---|
| 3,217,324 | 11/1965 | Adamsbaum et al. | 343/17.1 R |
| 3,302,162 | 1/1967 | Rowlands | 343/7.7 |
| 3,526,894 | 9/1970 | Guilhem et al. | 343/9 |

*Primary Examiner*—T. H. Tubbesing
*Attorney*—Q. Baxter Warner and Claude Funkhouser

EXEMPLARY CLAIM

2. A search system for detecting moving targets, in chaff, and including a transmitter for reflecting bursts of randomly phase coded, electromagnetic energy from a target, and a receiver, said receiver comprising
a delay line having a plurality of output taps thereon,
means for applying said reflected bursts to said delay line,
a plurality of phase shifters which are preset in accordance with the phase coding of said transmitter,
each phase shifting means being connected to a different output tap of said delay line, said plurality of phase shifters removing said phase coding from said bursts and providing a pure Doppler signal output, and
display means operably connected to receive the output from each of said phase shifting means for indicating the Doppler shift introduced by the target to each pulse of said burst.

5 Claims, 1 Drawing Figure

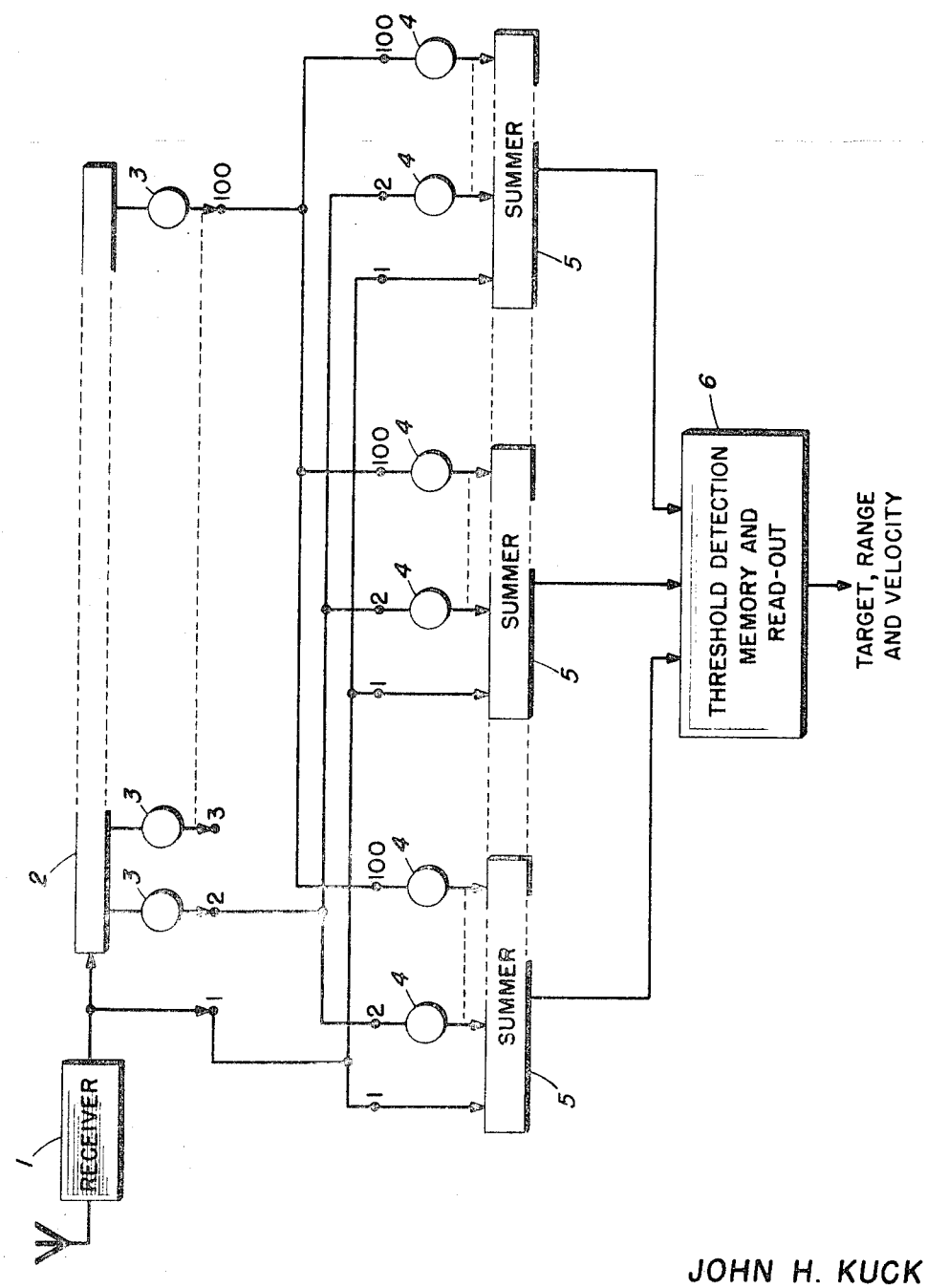

SEARCH SYSTEM

The present invention relates in general to radar systems and more particularly to a novel moving target indicating search system.

A search system has been proposed for detecting moving targets in chaff which utilizes transmission on a number of fixed frequencies. Intercomparison between different transmitted frequencies having slightly different pulse repetition frequencies was used to eliminate range ambiguities. Storage tubes and Doppler filter banks were used in the data processor.

The present invention provides a system in which the type of transmission is similar to the previously proposed system, however, only a single frequency need be transmitted. Range ambiguities are compensated for by randomly phase coding the transmitted pulses and decoding them on reception by a delay line matched filter technique. Although the system requires transmission of only a single frequency, frequency diversity may be obtained by duplication of equipment on different frequencies and adding outputs after detection. The matched filter principle utilized is similar to the well-known pulse compression technique.

An object of the present invention is to provide a radar system which utilizes a single pulse repetition frequency to eliminate range ambiguities.

Another object of the present invention is to provide a radar system which utilizes random phase coding of a single transmitting frequency to eliminate range ambiguities.

Other objects and many of the attendant advantages of this invention will be readily appreciated as the same becomes better understood by reference to the following detailed description when considered in connection with the accompanying drawing, wherein:

The FIGURE is a block diagram of the system constituting the present invention.

The system operates on the basis of 100 transmitted phase coded pulses per burst. The Doppler signals are picked up at a receiver 1 and applied to a 100 tap delay line 2 which has a delay time comparable to the time of transmission of each 100 pulse burst. The output of each tap in delay line 2 is then applied to a phase shifter 3 which is set according to the phase coding of the transmitted signals. For convenience only three of the phase shifters have been shown. The result is that the outputs of the phase shifters 3 are pure Doppler signals, all occurring in phase except for the Doppler phase shift introduced by the target. The delay line 1 has compensated for the time difference between the pulses in transmission and the phase shifters 3 have a compensated for the random phase coding in the transmitter.

In view of the foregoing discussion, it should be evident that although the various pulses comprising each transmitted burst have been referred to as being randomly phase coded, this phrase is not intended to in any way mean that the phase relationship between one transmitted pulse and another is unknown. Instead, this phrase merely means that the selected phase difference between successive pulses does not follow a uniform pattern; i.e., the phasing from pulse to pulse is varied according to a selected, yet random, pattern so that the coding of the radar signal will not be readily discernible by an enemy, for example. Moreover, since the phase coding of the transmitted pulses is known, the phase shifters 3 at the output of the delay line 1 can then be preset, either manually or electronically, to provide the proper amount of phase shifting to each received pulse which is necessary to remove the phase differences with which the radar signal is coded. As previously mentioned, the illustrated receiving apparatus is thus capable of readily distinguishing and extracting the radar information from the so-called chaff.

In order to detect the Doppler phase shift introduced by the target, a plurality of groups of fixed phase shifters 4 are provided. Each group of phase shifters 4 is set to cover one of the many Doppler frequency intervals expected to be covered by the system. The output of each of the phase shifters 3 is applied to an appropriate one of the phase shifters 4 in each Doppler frequency group. The outputs of all of the phase shifters 4 in a given group are then summed in a summer 5 and then applied to a detection, memory, and read-out system 6.

The theory of operation is as follows. The phase of the target reflection of the last transmitted pulse in the group of 100 transmitted pulses may be expressed as:

$$\phi_1 = \phi_0 + \phi_t + 4\pi r/\lambda \qquad (1)$$

where $\phi_0$ is the phase of the coherent transmitter source before the addition of random phase coding, $\phi_t$ is the random phase coding that is added in the transmitter, $r$ is the target range and $\lambda$ is the transmitted wavelength. Since this is the last pulse in the group it will be fed into the summers 5 undelayed.

The phase of any earlier pulse transmitted at a time $t_n$ before the last pulse will be:

$$\phi_n = \phi_o + \phi_{tn} + (4\pi r/\lambda) - wt_n + (4\pi v t n/\lambda) \qquad (2)$$

where V equals the target velocity in a radial direction. It is desired to remove the phase differences between the expressions in equations (1) and (2) so that all pulses will have equal phase when summed. To accomplish this a delay line 2 is chosen such that the n'th pulse is delayed by $t_n$. Thus, the n'th pulse will appear at this tap at the same time that the last pulse enters the summer 5 from the undelayed point at the delay line input. In addition, the delay of $t_n$ compensates for the term $-wt_n$ in equation (2) so that this term does not appear in the phase shift of the n'th pulse at the n'th tap.

From each tap of the delay line 2 the signal enters one of the phase shifters 3 whose phase shift is set at $\phi_{tn}$, thereby eliminating it from the expression for the phase of the n'th pulse. If the transmitted phase coding is restricted to 0° and 180°, then the phase shifters 3 can be inverting amplifiers that can be switched in and out.

Upon emerging from a phase shifter 3 each signal line splits into 70 channels and is carried to seventy different phase shifters 4 (only six being shown), one connected to each of 70 summers 5 (but three being shown). Each summer will give a peak response in a different one of the 70 different Doppler frequency intervals that are to be covered by the system. The function of the phase shifters 4 is to remove the $(4\pi v t n/\lambda)$ term. When the n'th pulse from the n'th delay line tap has passed through the phase shifter 4 connected to the last summer 5, its phase shift will be:

$$\phi_n = \phi_o + (4\pi tn/\lambda)(V - V_k)$$

When the target velocity $V$ equals the center velocity $V_k$ of the k'th channel, the quantity $(4\pi tn/\lambda)(V-V_k)$ is zero. The pulses from all the delay line taps are then in phase and add to give maximum response in the output of the summer.

The outputs of the seventy summers 5 carry simultaneously the information on all targets in the seventy velocity intervals. These pulses may be detected by the threshold detectors, and the range and velocity information may then be stored in the memory and read out sequentially, the detection, memory and read-out being represented by the block 6.

Obviously, many modifications and variations of the present invention are possible in the light of the above teachings. It is therefore to be understood that within the scope of the appended claims the invention may be practiced otherwise than as specifically described.

What is claimed is:

1. A search system for detecting a moving target in the presence of chaff, comprising
   a receiver,
   a delay line connected to the receiver,
   a plurality of phase shifters connected to the delay line,
   a second group of phase shifters connected to each of the first-mentioned phase shifters,
   a summer connected to selected phase shifters of the second group,
   a threshold detector connected to the summer,
   a memory storage unit connected to the detector, and
   a read-out device connected to the memory storage unit.

2. A search system for detecting moving targets, in chaff, and including a transmitter for reflecting bursts of randomly phase coded, electromagnetic energy from a target, and a receiver, said receiver comprising
   a delay line having a plurality of output taps thereon,
   means for applying said reflected bursts to said delay line,
   a plurality of phase shifters which are preset in accordance with the phase coding of said transmitter,
   each phase shifting means being connected to a different output tap of said delay line, said plurality of phase shifters removing said phase coding from said bursts and providing a pure Doppler signal output, and
   display means operably connected to receive the output from each of said phase shifting means for indicating the Doppler shift introduced by the target to each pulse of said burst.

3. The search system of claim 2, said receiver further including,
   a plurality of summing circuits, the number of summing circuits being equal to the number of Doppler frequency intervals over which the system is operative,
   means for connecting the output of each of said phase shifters to each of said summing circuits, and
   means for connecting the outputs of each summing circuit to said display means, whereby the Doppler shift of said burst due to the presence of a target may be detected over a range of Doppler frequency intervals.

4. The search system of claim 2, said receiver further including,
   a plurality of summing circuits equal in number to the number of Doppler frequency intervals within the operating range of said system, and
   means connecting the outputs of said summing circuits to said display means.

5. The search system of claim 4 in which said display means includes,
   a threshold detector, said detector securing the outputs of said summing circuits and selecting for display the output of maximum signal intensity.

* * * * *